United States Patent
Di Censo et al.

(10) Patent No.: US 10,067,568 B2
(45) Date of Patent: Sep. 4, 2018

(54) AUGMENTED REALITY WRITING SYSTEM AND METHOD THEREOF

(75) Inventors: Davide Di Censo, Oakland, CA (US); Stefan J. Marti, Oakland, CA (US); Seung Wook Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 13/407,117

(22) Filed: Feb. 28, 2012

(65) Prior Publication Data

US 2013/0222381 A1  Aug. 29, 2013

(51) Int. Cl.
- G06F 3/01 (2006.01)
- G06T 19/00 (2011.01)
- G06F 3/0354 (2013.01)
- G06F 3/03 (2006.01)
- G06F 3/042 (2006.01)
- G06F 3/0488 (2013.01)

(52) U.S. Cl.
CPC ............ G06F 3/017 (2013.01); G06F 3/0304 (2013.01); G06F 3/03545 (2013.01); G06F 3/0425 (2013.01); G06F 3/04883 (2013.01); G06T 19/006 (2013.01)

(58) Field of Classification Search
CPC ........ G06F 3/04886; G06F 3/14; G06F 3/014; G06F 3/017; G06F 3/0482; G06F 17/3028; G06T 19/006; G06T 2207/30244; G06T 15/00; G06T 2207/30208; G06T 7/204; G06T 15/50; G06T 19/00

USPC .......................................................... 345/633
See application file for complete search history.

(56) References Cited

U.S. PATENT DOCUMENTS

| | | | |
|---|---|---|---|
| 5,780,841 A | 7/1998 | Bakker et al. | |
| 6,462,941 B1 * | 10/2002 | Hulick et al. | 361/679.24 |
| 7,796,802 B2 | 9/2010 | Smith | |
| 8,063,887 B2 | 11/2011 | Barrus et al. | |
| 2002/0167536 A1 | 11/2002 | Valdes et al. | |
| 2005/0156915 A1 * | 7/2005 | Fisher | 345/179 |
| 2006/0227151 A1 * | 10/2006 | Bannai | A63F 13/00 345/633 |
| 2008/0129708 A1 * | 6/2008 | Chien et al. | 345/179 |
| 2008/0166049 A1 * | 7/2008 | Wang et al. | 382/189 |
| 2010/0125812 A1 | 5/2010 | Hartman | |
| 2010/0156787 A1 * | 6/2010 | Katayama | G02B 27/017 345/157 |
| 2010/0199232 A1 * | 8/2010 | Mistry | G06F 1/163 715/863 |

(Continued)

*Primary Examiner* — Zhengxi Liu
*Assistant Examiner* — Yi Yang
(74) *Attorney, Agent, or Firm* — Kilpatrick Townsend & Stockton/Qualcomm

(57) ABSTRACT

Embodiments of the present invention disclose an augmented reality writing system and method thereof. According to one example embodiment, the system includes a handheld writing tool having an end portion and a display device for displaying digital content for viewing by an operating user. An optical sensor is coupled to the display device and includes a field of view facing away from the operating user. Furthermore, coupled to the optical sensor is a processing unit configured to detect and track the position of the end portion of the handwriting tool. In accordance therewith, handwritten content is digitally rendered on the display device to correspond with the handwriting motion of the writing tool within the field of view of the optical sensor.

19 Claims, 8 Drawing Sheets

(56) References Cited

U.S. PATENT DOCUMENTS

| | | | |
|---|---|---|---|
| 2010/0277420 A1 | 11/2010 | Charlier et al. | |
| 2011/0205242 A1* | 8/2011 | Friesen | G06F 3/011 |
| | | | 345/633 |
| 2012/0105487 A1* | 5/2012 | Son et al. | 345/671 |
| 2012/0113140 A1* | 5/2012 | Hilliges et al. | 345/633 |
| 2012/0162214 A1* | 6/2012 | Chavez et al. | 345/419 |
| 2012/0229508 A1* | 9/2012 | Wigdor et al. | 345/633 |

* cited by examiner

AUGMENTED REALITY WRITING SYSTEM AND METHOD THEREOF

BACKGROUND

The emergence and popularity of mobile computing has made portable electronic devices, due to their compact design and light weight, a staple in today's marketplace. Moreover, providing efficient and intuitive interaction between devices and users thereof is essential for delivering an engaging and enjoyable user-experience. For example, stylus or pen-based input systems provide a natural user interface for computing systems by enabling handwriting input via a touch-enabled display and/or digital pen. In such systems, handwriting of the user is recorded by detecting movement of the digitized pen or stylus across a front surface of the display or other unique surface. In some instances, however, a user may desire to discretely capture handwritten input without the use of a digital pen stylus or touch-enabled tablet.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
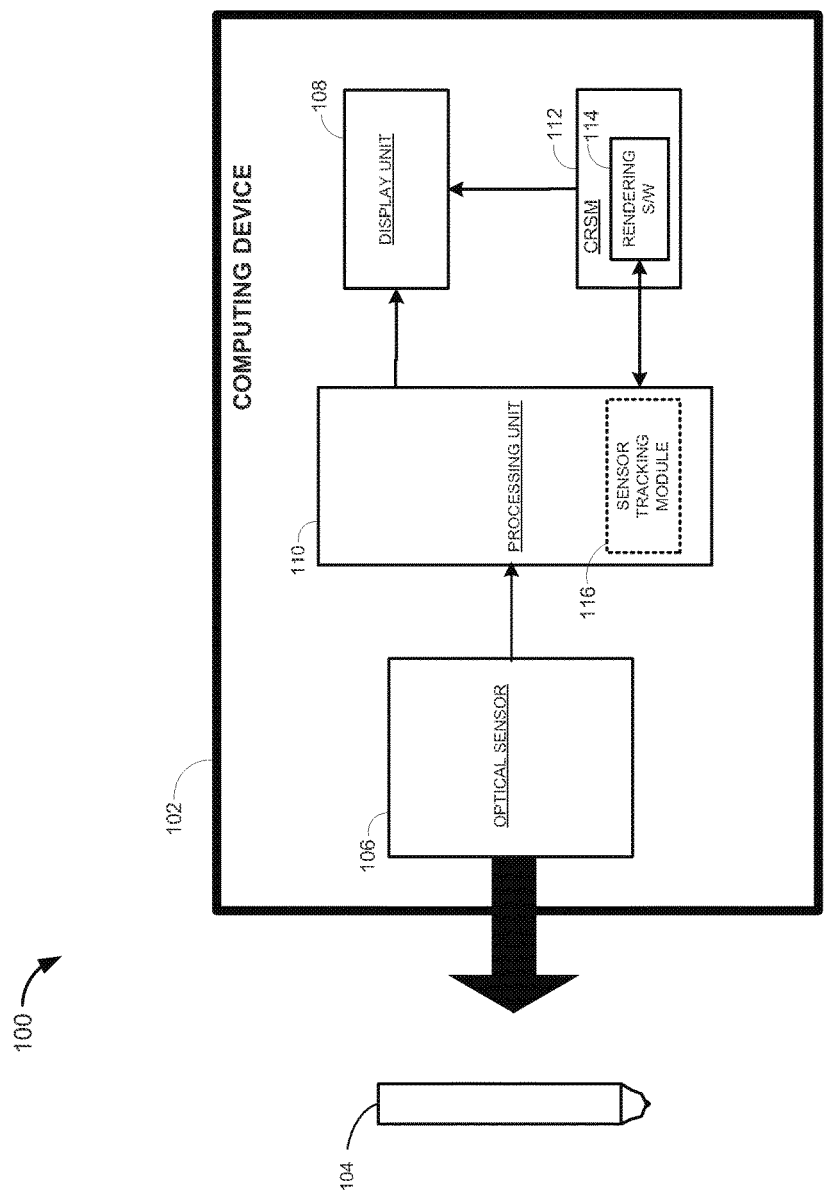
FIG. 1 is a simplified block diagram of the augmented reality writing system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Presently, handwriting or drawing input is currently recognized and recorded by computing systems in one of two ways. In one implementation, handwriting input is captured via expensive and complex digitized pens which are location-tracked, either using triangulation (e.g., ultrasonic acoustic waves and receivers connected to the paper the user is writing on), or through use of a patterned paper having small markers formed thereon, in addition to a camera, memory, and processor embedded within the digitized pen (e.g., Anoto™ Digital Pen). Moreover, the handwriting or drawing actually occurs as ink on paper or similar surface, and the system simply records the movements of the pen and digitizes the writing. This solution is disadvantageous, however, as it requires a digitized pen and a receiver or unique paper within close proximity to the pen. In addition, the resulting digital graphic is generally not visible immediately but rather stored inside the receiver for future viewing on a traditional computer. And since the ink-based handwriting is actually visible, privacy is compromised in addition to the target document or surface being physically modified by the pen ink.

Alternatively, drawing input may be captured through operation of tablet personal computers having touch-enabled displays configured to recognize the movement of a pen across a display surface. However, this configuration poses similar disadvantages as the prior solution. For instance, significant production costs are generally imposed in the manufacture of specialized pens and/or touch-enabled display surfaces (e.g., capacitance sensors, calibration, etc.). In addition, the user is confined to the size of the display surface as the writing space. Still further, though a user's writing input may be recognized by the computing system, most touch-based computing devices fail to provide an augmented reality experience using the display and writing tool.

Examples of the present invention provide a system and method for augmented reality writing. According to one example, embodiments described herein enable a user to handwrite or draw on any surface without the use of conventional ink. More particularly, the user is able to visualize their handwritings or drawings on or through a handheld transparent display immediately and with minimal lead time (rendering/processing time). In another example, the augmented reality writing system is capable of recognizing handwriting or drawing motions from a user via an optical sensor and then rendering the ink digitally on the handheld display only when the display is pointed toward the area of writing. That is, examples of the present invention allow an operating user to write on surfaces and documents in confidence and without compromising the physical integrity of the surface or document.

Referring now in more detail to the drawings in which like numerals identify corresponding parts throughout the views, FIG. 1 is a simplified block diagram of the augmented reality writing ("ARW") system according to an example of the present invention. As shown here, the ARW system 100 includes a writing tool 104, a processing unit 110 coupled to a display device 108 and optical sensor 106, and rendering software 114 and computer-readable storage medium 112. In one embodiment, processor unit 110 represents a central processing unit (CPU), microcontroller, microprocessor, or logic configured to execute programming instructions associated with the ARW system and computing device 102. In accordance with one example embodiment, the display device 108 represents a see-through display such as a transparent display panel (e.g., LCD, or AMOLED), a glass projection surface (i.e., a glass surface with a projection film applied on top, and a micro projector attached to the glass to display images on the glass, either from the back or from the front), or a display with an in-line camera (e.g., video see-through display). Writing tool 104 represents a pen-shaped device such as an ink pen, marker, or stylus pen for example. Alternatively, the drawing or writing tool 104 could be an active stylus configured to emit signals that are detectable by the processing unit 110. In such a configuration, the emitted signals could be ultrasonic, infrared, RF, or similar wireless communication protocol, and trilateration computing techniques may be utilized by the processing unit 110 to locate an end portion of the writing tool 104 within three degrees of freedom (i.e., yaw, pitch, and roll) based on the detected signal. In one example, the optical sensor 106 represents a rear-facing imager (i.e., pointed away from the operating user) for detecting features of the writing tool 104. Additionally, the optical sensor 106 or processing unit 110 may include a sensor tracking module 116 for positional tracking of the writing tool 104 during handwriting motion of the user. Rendering software 114 is configured to render the tracking data received from the optical sensor 106 and processing unit 110 onto the display device 108. Computer-readable storage medium 112 represents non-transitory or volatile storage (e.g. random access memory), non-volatile store (e.g. hard disk drive, read-only memory, compact disc read only memory, flash storage, etc.), or combinations thereof. Furthermore, storage medium 112 may include the rendering software 114 that is executable by processing unit 110 and, that when executed, causes the processing unit 110 to perform some or all of the functionality described herein. For example, the sensor tracking module 116 may also be implemented as executable software within the storage medium 112. Moreover, the display device 108 and the computing device 102 could be integrated (e.g., the processor and other computing elements are located in the frame of the display device), or the display device 108 may be connected (wired or wirelessly via Bluetooth™ or Wi-Fi) to an external computer such as a smartphone, tablet, or similar computing device.

Figure 2:
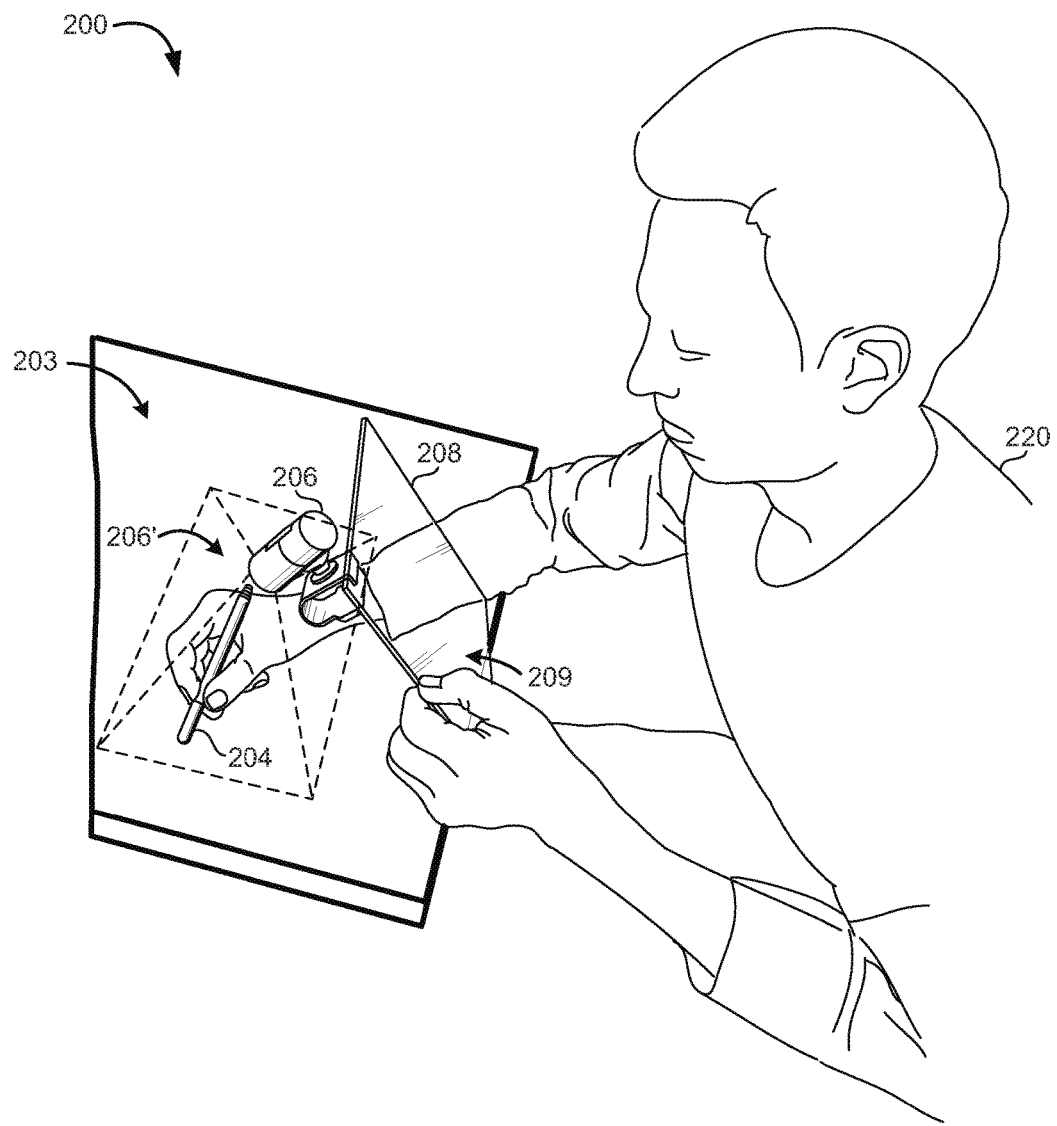
FIG. 2 is a three-dimensional perspective view of an operating user utilizing the augmented reality writing system according to an example of the present invention.

FIG. 2 is a three-dimensional perspective view of an operating user utilizing the augmented reality writing system according to an example of the present invention. As shown here, the system 200 includes a user 220 holding a display device 208 over a desk surface 203. In the present example, the display device 208 is represented by a transparent display so as to allow the user 220 to view the scene 206' in the volumetric space behind the display 208 (i.e., visual representation of objects in three physical dimensions) as he writes using the writing tool 204. According to one example embodiment, the optical sensor 206 is positioned along an upper edge of the display device 208 and is angled to face away from the operating user 220 (i.e., rear side of device). However, examples of the present invention are not limited thereto as the optical sensor 206 may be positioned at any location of the display device so long as to provide a rear view thereof. More particularly, the ARW system is configured to track handwriting movement of the writing tool 204 within a field of view 206' of the sensor 206 represented by dotted lines in the present example.

Figure 3A:
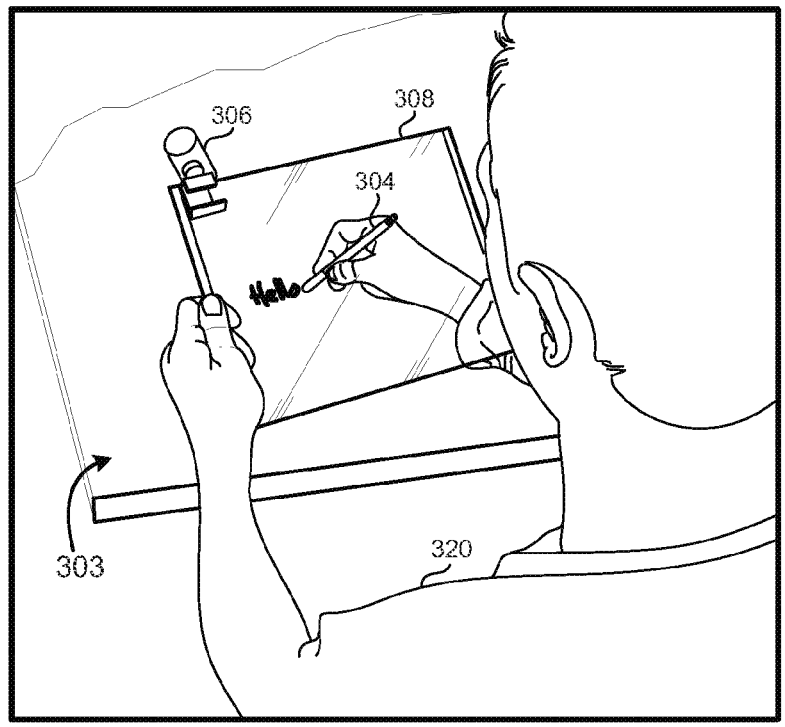
FIGS. 3A and 3B are illustrations of handwriting tracking and digital rendering of the handwritten content using the augmented reality writing system according to an example of the present invention.
Figure 3B:
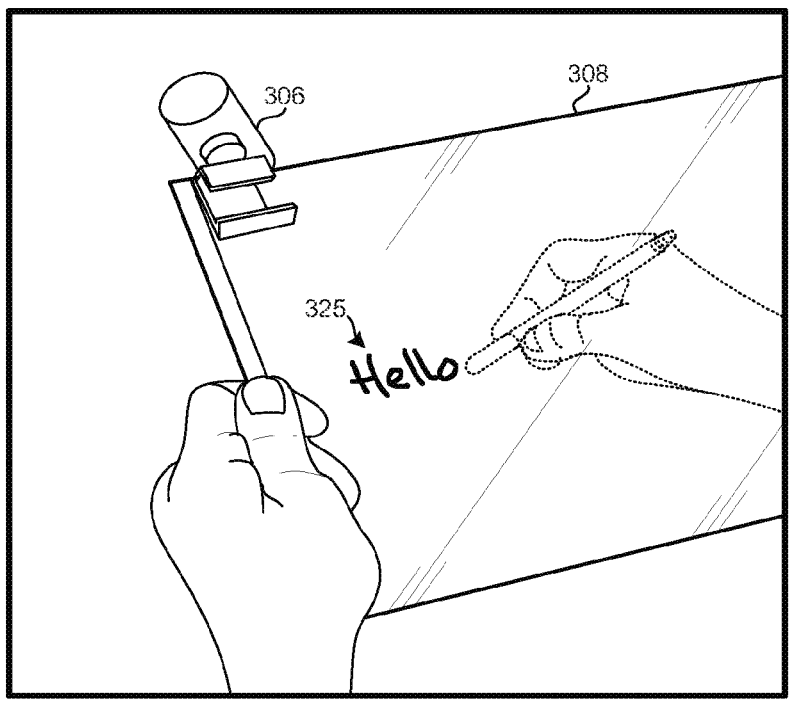

FIGS. 3A and 3B are illustrations of handwriting tracking and digital rendering of the handwritten content using the augmented reality writing system according to an example of the present invention. FIG. 3A depicts the user 320 handwriting the word "Hello" within the field of view of the optical sensor 306 via a writing tool 304. More particularly, handwriting detection is based on the movement of the writing tool 304 within the scene or viewing area (i.e., sensor field of view) and without the use of conventional ink. FIG. 3B depicts the digital ink or virtual handwritten content 325 as it appears on a front side of the display device 308. Moreover, the virtual content 325 ("Hello") is rendered on the display device 308 to correspond with the actual position it was written with respect to the user's movement of the writing tool 304 along the desk surface (or three-dimensional space).

Figure 4A:
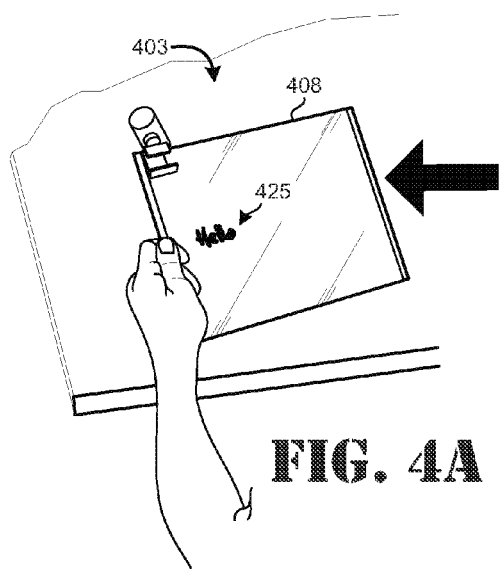
FIGS. 4A-4C illustrate the digital handwritten content while displayed in a first operating mode according to an example of the present invention.
Figure 4B:
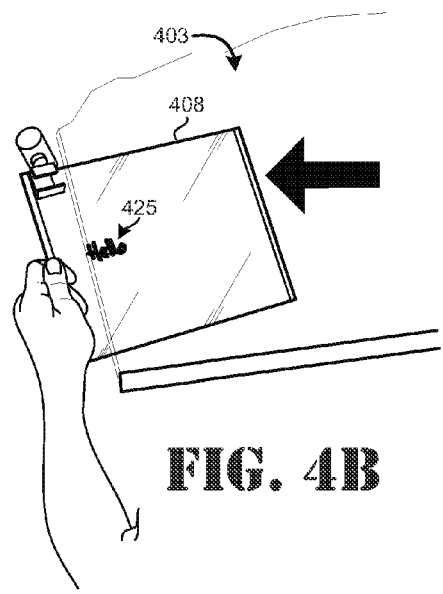
Figure 4C:
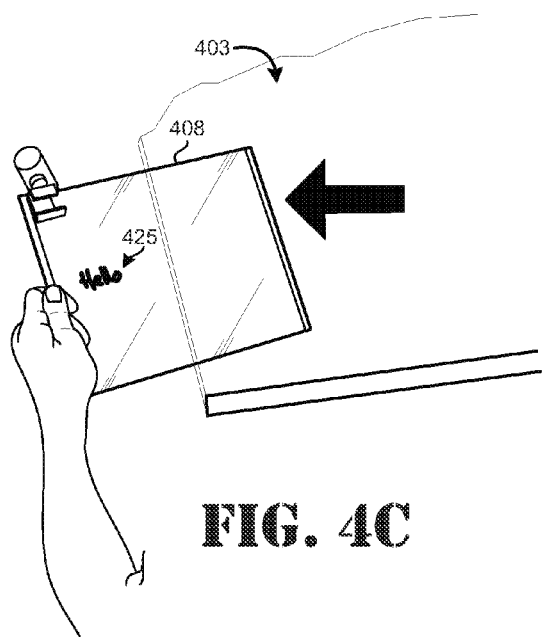

FIGS. 4A-4C illustrate the digital handwritten content while displayed in a first operating mode according to an example of the present invention. As shown in FIG. 4A, the display device 408 displays the virtual handwritten content 425 thereon. In the present example and first operating mode, the user's handwriting is tracked and rendered on the transparent display 408, but the virtual handwritten content 425 is not registered with the current background or scene in which it was written (i.e., arbitrary surface/background). FIGS. 4B and 4C depict the user moving the display device 408 leftward and away from the desk surface 403. As depicted in the present illustrations, the digital ink 425 remains stationary with respect to the display, and moves as the display device 408 is relocated. Thus, handwriting content may be captured from a desk surface or other area such that the content is stored locally for viewing anywhere the user desires the virtual content to appear. For example, while in the first operating mode (i.e., arbitrary or unregistered mode), an operating user may start writing a note on one surface and then continue writing the note later on another desk surface.

Figure 5A:
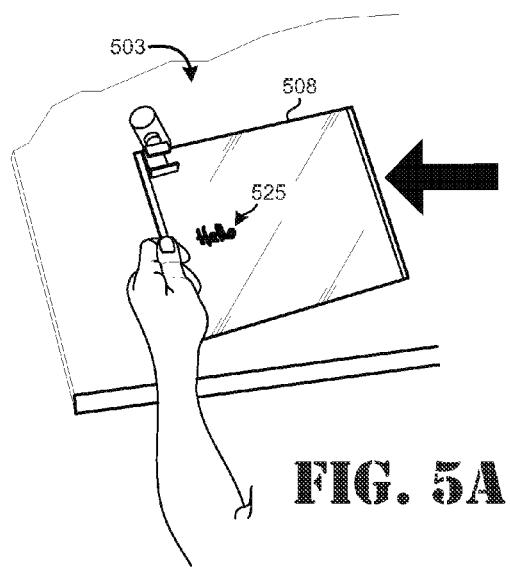
FIGS. 5A-5C illustrate the digital handwritten content while displayed in a second operating mode according to an example of the present invention.
Figure 5B:
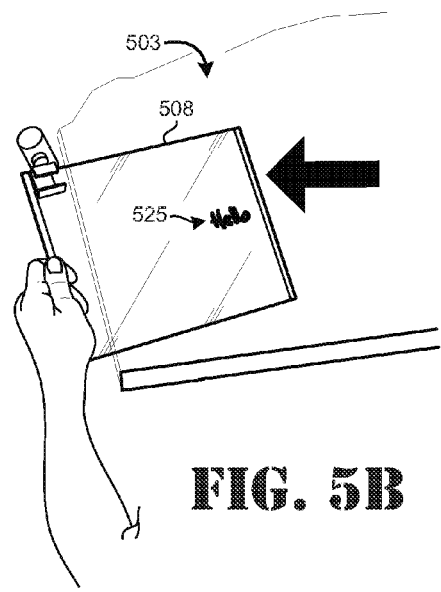
Figure 5C:
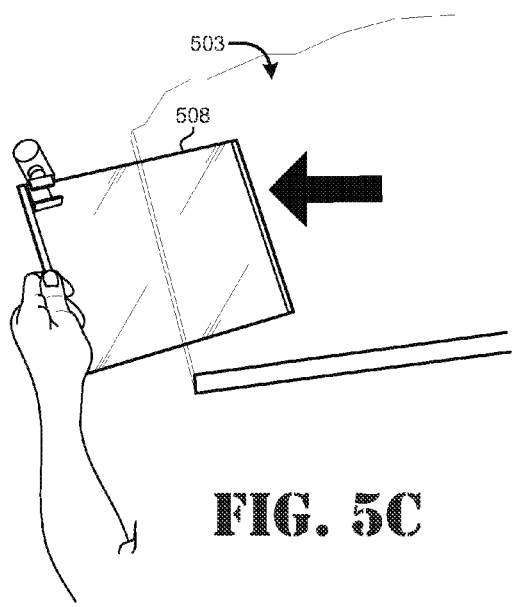

FIGS. 5A-5C illustrate the digital handwritten content being displayed in a second operating mode according to an example of the present invention. As in the previous example of FIGS. 4A-4C, the virtual handwritten content 525 is displayed on the display device 508 and corresponds with handwriting movement of the end portion of the writing tool. In contrast to the example embodiment described above, however, when in the second operating mode virtual content 525 is registered with the background such that the displayed virtual ink 525 "sticks" to the background when the display device 508 is relocated as shown in FIGS. 5B and 5C. Here, the optical sensor and processing unit may be configured to detect fiducial markers, natural features, or other reference elements for associating with the background scene (i.e., camera field of view) so as to allow the handwritten text to be displayed as an augmented reality object 525 only when the optical sensor is pointed toward the scene. In this embodiment, the system may use computer vision methods such as parallel tracking and mapping algorithms ("PTAM") for enabling the virtual handwritten content 525 to "stick" to the surface regardless of the user changing the perspective, location, and/or orientation of the display device. As shown in FIG. 5C, the virtual content 525 has disappeared from the front surface of the display device 508 as the device and optical sensor no longer face a direction of the scene involving the original handwritten input. Thus, examples of the present invention enable an operating user to annotate a physical object such as a document and see their modifications only through the handheld screen and without altering the physical counterpart. The user can enrich a surface like a desk, wall, or the like simply by writing text or drawing such that the text/drawing is only displayed as a virtual object by the ARW system when held in direction facing that specific surface/place.

For example, Chef Y may be reading a cookbook and discovers an interesting recipe. While following the recipe, Chef Y begins making some variations in quantities and ingredients to accommodate preferences and taste. Chef Y desires to annotate these differences to remember their personal variations for the next time, but doesn't want to ruin the book by writing directly thereon. Chef Y places the handheld display over the cookbook and is able to visualize the written recipe due to the transparency of the display. Using a pen-shaped device, Chef Y begins making annotations such as scratching ingredients, circling others, changing quantities, etc. The AWR system displays the changes on the page in the same way ink would appear on the page, and also associates the annotations with the specific page in the cookbook via fiducial or reference markers (e.g., recipe name or image of prepared dish). In accordance with the present examples, these annotations will only be displayed when Chef Y holds the display in front of the specific page associated with the marker.

Figure 6A:
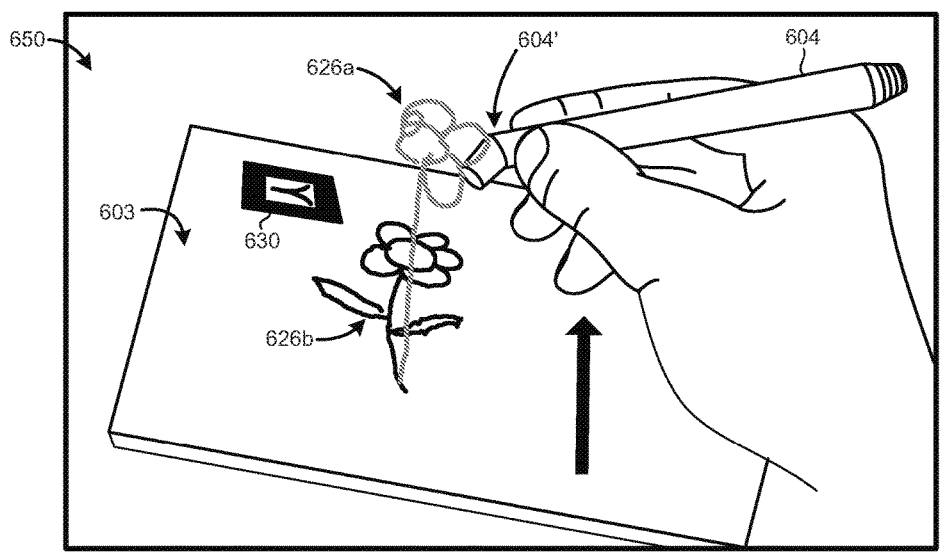
FIGS. 6A and 6B illustrate the digital handwritten content while displayed in a three-dimensional virtual environment in accordance with an example of the present invention.
Figure 6B:
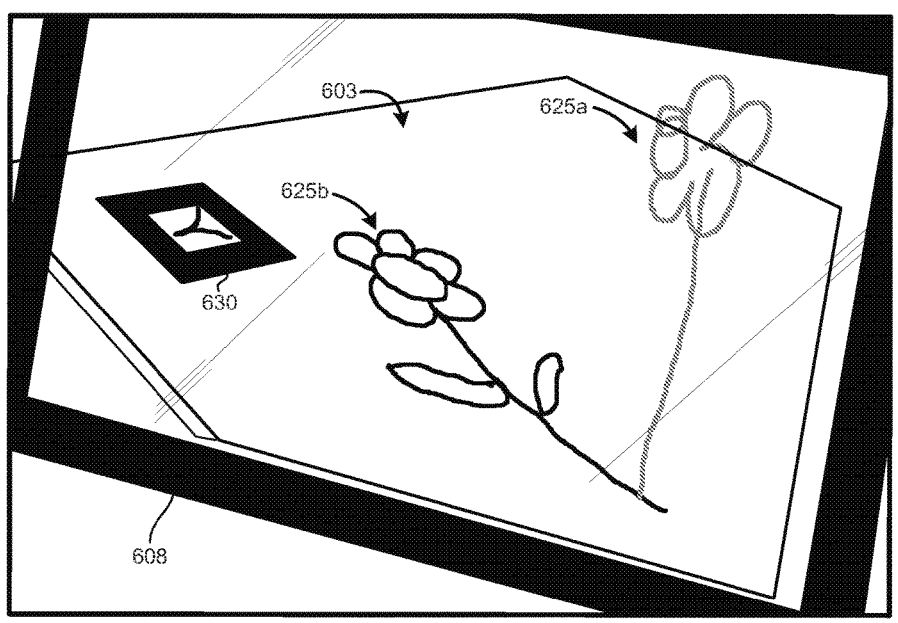

FIGS. 6A and 6B illustrate the digital handwritten content being displayed in a three-dimensional virtual environment. FIG. 6A depicts a scene 650 as viewed from the display device in which the operating user creates a sketch drawing 626*a* in three-dimensional space rather than on the desk surface 603 (sketch drawing 626*b* is on the desk surface). Here, the user moves the writing tool 604 upward into three-dimensional space (perpendicular to the desk surface 603) in the creation of sketch drawing 626*a*. According to one example, the AWR system may associate the scene 650 with the reference marker 630 so that the sketch drawings 626*a* and 626*b* are displayed only when the device faces a direction of the reference marker 630, or as long as the reference marker 630 remains within the field of view of the optical sensor. In the side view profile view of FIG. 6B, the display device 608 is rotated clockwise around the reference marker 630. As shown here, the virtual ink/content 625*a* and 625*b* associated with sketches 626*a* and 626*b* remain at their original sketched positions with content 625*a* appearing to extend perpendicularly from desk surface 603 in three-dimensional space. More particularly, stereoscopic, multiscopic, or similar rendering methods may be used to render the virtual handwritten content 625 within three-dimensional space. Specifically, the virtual handwritten content 625*a* and 625*b* is rendered to correspond with the exact location of the end portion 604' of the writing tool 604 and within the volumetric space behind the display device 608 (space opposite the front surface side 209 in FIG. 2). As such, the virtual content 625*a* and 625 appear to the user on the display device 608 as three-dimensional objects within the scene 650.

Figure 7:
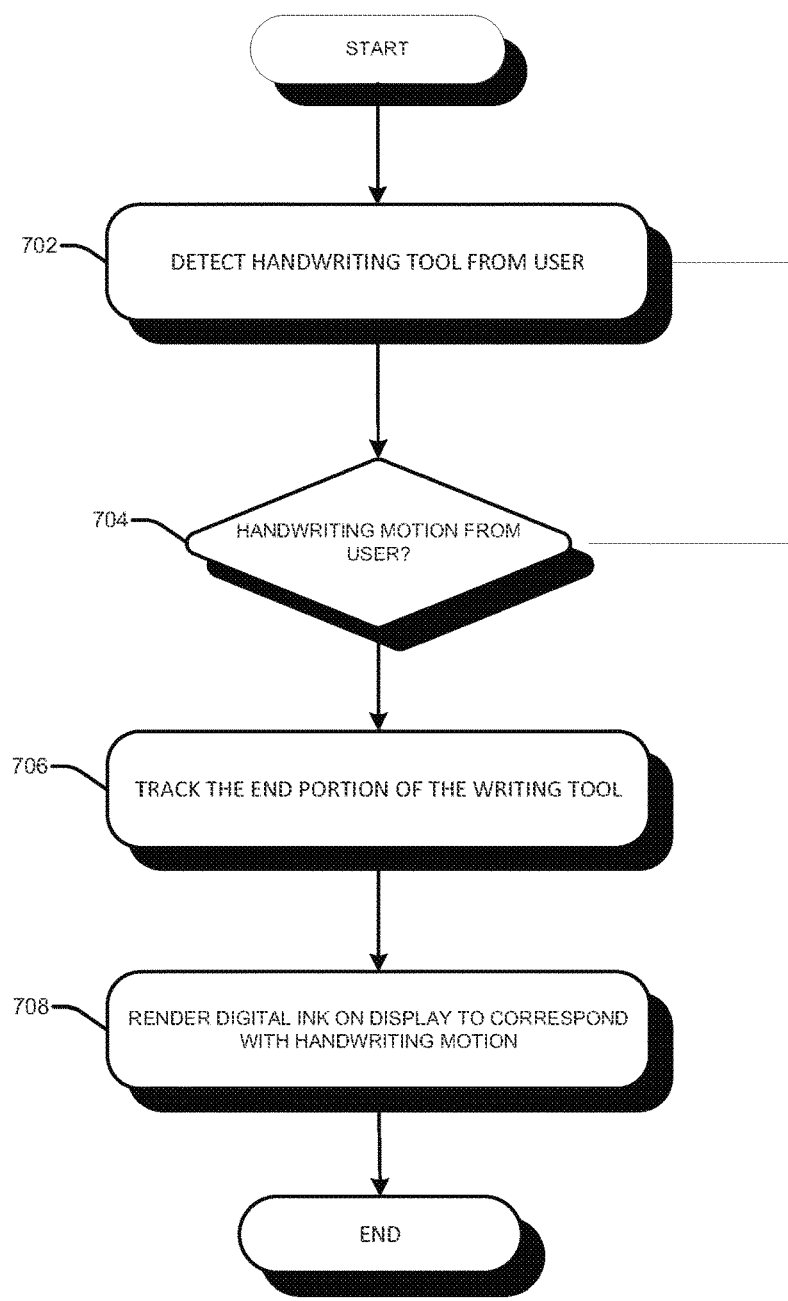
FIG. 7 is a simplified flow chart of the processing steps for providing augmented reality writing in a first operating mode in accordance with an example of the present invention.

FIG. 7 is a simplified flow chart of the processing steps for providing augmented reality writing in a first operating mode in accordance with an example of the present invention. In step 702, the system detects the presence of a handwriting tool within the field of view of the rear-facing optical sensor. Upon the determination of handwriting movement from the user in step 704, an end portion of the writing tool is tracked by the processing unit or sensor tracking module in step 706. Simultaneously, digital ink is rendered on the display device so as to correspond with the handwriting motion of the user operating the writing tool. The digital ink or virtual handwritten content may then be saved locally on the computing device for subsequent retrieval (e.g., soft copy of the handwritten document that can be virtually shared, published or archived).

For another use-case example, employee X is in a meeting and desires to take notes in digital format and email them to his coworkers who were unable to attend the meeting. Employee X did not bring their cumbersome notebook computer and instead holds and points their lightweight transparent display at the nearby desk surface. Without paper and without removing the pen cap, employee X may simply start writing on the desk surface with pen in hand. The AWR system is configured to trace employee X's handwriting at the exact location via tracking of the end portion of the pen. Concurrently, the system records employee X's writing and stores the virtual content in local memory for subsequent transmission to the absent coworkers.

Figure 8:
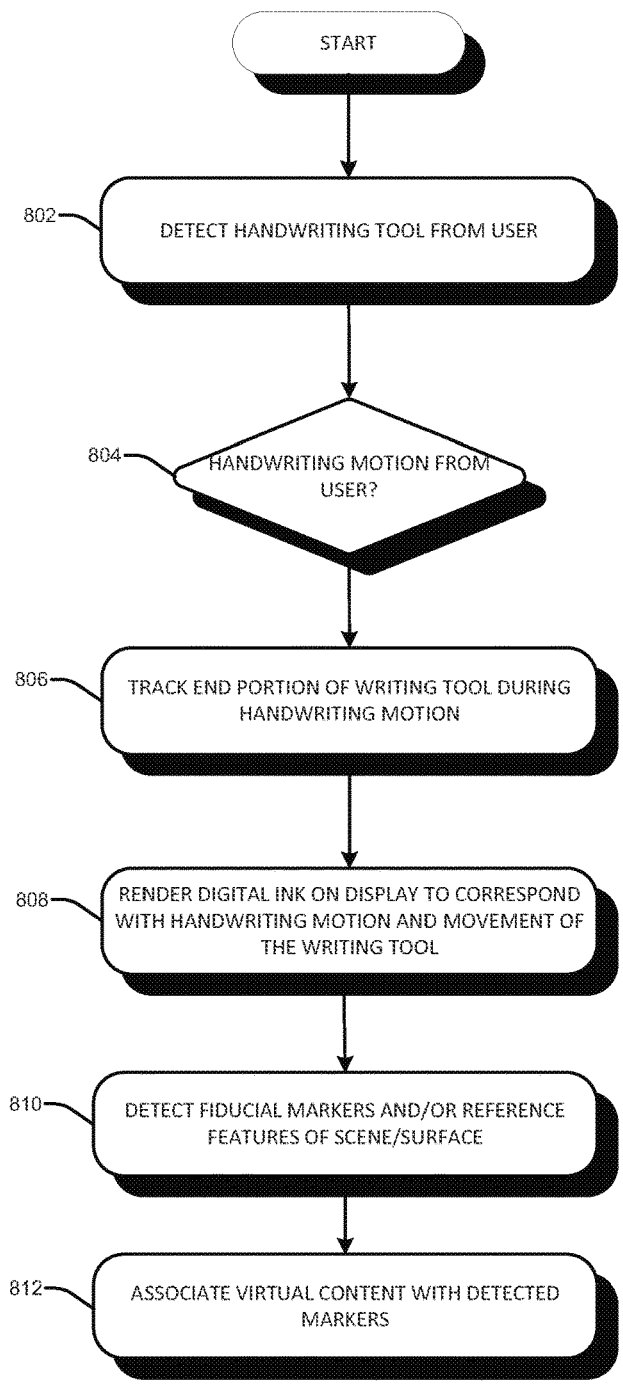
FIG. 8 is a simplified flow chart of the processing steps for providing augmented reality writing in a second operating mode in accordance with an example of the present invention.

FIG. 8 is a simplified flow chart of the processing steps for providing augmented reality writing in a second operating mode in accordance with an example of the present invention. In step 802, the system detects the presence of a user's hand and a handwriting tool within the field of view of the rear-facing optical sensor. As in the previous example, an end portion of the writing tool is continuously tracked in step 806 upon the detection of movement of the writing tool by the operating user in step 804. Thereafter, in step 808, virtual handwritten content—corresponding with user movement of the writing tool within the camera FOV/scene—is then rendered on the display device. Next, in step 810, the system detects and determines fiducial markers or reference features of the surface and/or scene. In accordance therewith, the virtual handwritten content is associated with the detected markers such that the content "sticks" or is registered with the specific background/surface.

In another example use-case scenario involving the second operating mode, Artist Z wants to identify a graphic design to paint on a customer's white living room wall. Artist Z is good at drawing by hand and wants to show the customer not only the idea of the drawing, but also what the drawing would look like on that specific wall with the existing furniture. While holding transparent display to face the wall, Artist Z takes a paintbrush and without paint begins "dry drawing" on the wall. In real-time, the transparent display shows exactly what Artist Z is painting and associates the painting to that specific location on the wall. Even if Artist Z is unable to finish the work given the allotted time, Artist Z may come back the day after and the virtual painting will be displayed in the same exact position and at the same level of completeness as when Artist Z had left. This may also give the artist and client an opportunity to see the artwork in daylight versus at night for further aesthetical consideration.

Embodiments of the present invention provide system and method for augmented reality writing that allows the user to see the virtual handwritten content right away and in corresponding position on a display screen. The present configuration also provides a method to bind virtual handwritten content/drawing to a specific area or surface, which can be seen only when the handheld display device is aimed to the specific area or surface. That is, the present examples allow for private handwriting that is visible only through the handheld display device.

Moreover, many advantages are afforded by the writing system in accordance with examples disclosed herein. For instance, the operating user is afforded the freedom of writing a document or drawing a sketch on any surface or space without the need for special receivers or surfaces. In addition, augmented reality writing is accomplished by the user through utilization of any regular pen or pen-like tool with or without ink. Still further, privacy of writing is afforded without leaving any physical ink or a written copy of the created document or note.

Furthermore, while the invention has been described with respect to exemplary embodiments, one skilled in the art will recognize that numerous modifications are possible. For example, although exemplary embodiments depict a transparent display as the display device, the invention is not limited thereto. For example, the present system may be implemented on various platforms with handheld displays such as smartphones and tablet personal computers, in addition to desktop systems, laptops, notebooks, netbooks, cell phones, or any other electronic device having a means for see-through display. Thus, although the invention has been described with respect to exemplary embodiments, it will be appreciated that the invention is intended to cover all modifications and equivalents within the scope of the following claims.

What is claimed is:

1. An augmented reality writing system comprising:
    a memory;
    a display device including a transparent display;
    a sensor arranged to provide position information identifying positions of a writing tool within a scene in a volumetric space behind the display device; and
    a processing unit communicatively coupled to the memory, the sensor and the transparent display, said processing unit being programmed to execute instructions stored in the memory to render a digital image on the transparent display corresponding to motion of the writing tool within the scene based on the position information so that the digital image is visible in the context of the scene, wherein, in a first mode, the digital image corresponding to the motion of the writing tool remains stationary with respect to the transparent display when the display device is moved.

2. The system of claim 1, wherein the digital image is rendered on a front surface of the transparent display, the front face facing a user operating the writing tool.

3. The system of claim 2, wherein, in the second mode, the digital image corresponding to the motion of the writing tool is associated with the scene via a fiducial marker identified by the processing unit.

4. The system of claim 3, wherein the digital image and the identified fiducial marker are saved in the memory for subsequent retrieval.

5. The system of claim 1, wherein, in a second mode, the digital image corresponding to the motion of the writing tool is associated with the scene such that the digital image remains stationary with respect to the scene when the display device is moved.

6. The system of claim 1 further comprising the writing tool, wherein the writing tool is an active stylus configured to emit signals that are sensed by the sensor for locating a three-dimensional position of an end portion of the stylus.

7. The system of claim 1, wherein the transparent display includes a transparent display panel, a glass projection surface, or a display panel having an in-line rear camera.

8. The system of claim 1, wherein the digital image is displayed in a three-dimensional virtual environment.

9. A computer-implemented method comprising:
    detecting, via a sensor, positions of a writing tool within a scene in a volumetric space behind a display device including the sensor and a transparent display; and
    rendering, via a processing unit, virtual handwritten content on the transparent display corresponding to motion of the writing tool within the scene so that the virtual handwritten content is visible in the context of the scene, wherein, in a first mode, the virtual handwritten content corresponding to the motion of the writing tool remains stationary with respect to the transparent display as the display device is moved.

10. The method of claim 9, wherein the steps of rendering the virtual handwritten content further comprises:
    displaying the virtual handwritten content corresponding to the motion of the writing tool on a front surface of the transparent display facing an operating user.

11. The method of claim 9, further comprising, in a second mode:
    determining a reference marker; and
    associating the virtual handwritten content corresponding to the motion of the writing tool with the reference marker so that the virtual handwritten content is displayed based on a position of the reference marker in the scene.

12. The method of claim 11, further comprising:
    displaying the virtual handwritten content only when the sensor is pointed in a direction of the scene and the reference marker is within a field of view of the sensor.

13. The method of claim 9, further comprising:
    emitting, via the writing tool, a signal; and
    detecting, via the sensor, the signal emitting from the writing tool so as to locate and track movement of an end portion of the writing tool in the volumetric space.

14. The method of claim 9, where the virtual handwritten content appears as three-dimensional objects within the volumetric space behind the display using stereoscopic rendering.

15. The method of claim 9, wherein the transparent display includes a transparent display panel, a glass projection surface, or a display panel having an in-line rear camera.

16. A non-transitory computer-readable storage medium having stored executable instructions that, when executed by a processor, cause the system to:
    track, using a display device including a sensor and a transparent display, positions of a writing tool within a scene in a volumetric space behind the transparent display; and
    render digital ink on the transparent display, wherein the rendered digital ink corresponds to the positions of the writing tool within the scene so that the digital ink is visible in the context of the scene, wherein, in a first mode, the digital ink corresponding to the motion of the writing tool remains stationary with respect to the transparent display when the display device is moved.

17. The non-transitory computer-readable storage medium of claim 16, wherein, in a second mode, the executable instructions, when executed by the processor, further cause the system to:
  determine a fiducial marker in the scene; and
  display the digital ink upon a detection of the fiducial marker.

18. The non-transitory computer-readable storage medium of claim 16, wherein, in a second mode, the executable instructions, when executed by the processor, further cause the system to display the digital ink corresponding to the motion of the writing tool in association with the scene such that the digital ink remains stationary with respect to the scene when the display device is moved.

19. The non-transitory computer-readable storage medium of claim 16, wherein the executable instructions when executed by the processor, further cause the system to:
  detect a signal emitted from the handwriting tool;
  track movement of the end portion of the handwriting tool in the volumetric space so as to create a three-dimensional image corresponding to said movement; and
  display the three-dimensional image on the transparent display.

\* \* \* \* \*